US008120460B1

(12) United States Patent (10) Patent No.: US 8,120,460 B1
Zhu (45) Date of Patent: Feb. 21, 2012

(54) ELECTRONIC KEY PROVISIONING

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 632 days.

(21) Appl. No.: 12/348,362

(22) Filed: Jan. 5, 2009

(51) Int. Cl.
 B60R 25/00 (2006.01)
 G05B 19/00 (2006.01)
 G05B 23/00 (2006.01)
 G06F 7/00 (2006.01)
 G06F 7/04 (2006.01)
 G08B 29/00 (2006.01)
 G08C 19/00 (2006.01)
 H04B 1/00 (2006.01)
 H04B 3/00 (2006.01)
 H04Q 1/00 (2006.01)
 H04Q 9/00 (2006.01)

(52) U.S. Cl. .......... 340/5.73; 340/5.1; 340/5.2; 340/5.7; 340/5.74

(58) Field of Classification Search .................. 340/5.1, 340/5.2, 5.7, 5.73, 5.74
See application file for complete search history.

(56) References Cited

U.S. PATENT DOCUMENTS

| 7,081,806 | B2 * | 7/2006 | Koike | 340/5.6 |
| 7,796,012 | B2 * | 9/2010 | Gerstenkorn | 340/5.61 |
| 2004/0219903 | A1 * | 11/2004 | Despain et al. | 455/410 |
| 2006/0106727 | A1 * | 5/2006 | Yellai et al. | 705/59 |
| 2007/0109103 | A1 * | 5/2007 | Jedrey et al. | 340/10.5 |
| 2007/0159297 | A1 * | 7/2007 | Paulk et al. | 340/5.73 |
| 2009/0018963 | A1 * | 1/2009 | Abu-Amara | 705/59 |
| 2009/0225989 | A1 * | 9/2009 | Koike | 380/278 |

* cited by examiner

Primary Examiner — Daniel Wu
Assistant Examiner — Kam Ma

(57) ABSTRACT

A method for method of initializing an electronic lock is disclosed. The method comprises a point-of-sale terminal reading electronic lock identification information from the electronic lock and the point-of-sale terminal receiving confidential information from a mobile electronic device. The method also comprises an inventory control system that is coupled to the point-of-sale terminal and that transmits an electronic lock registration message, wherein the registration message contains at least some of the confidential information and at least some of the identification information. When the inventory control system receives an electronic access code in response to the electronic lock registration message, the point-of-sale terminal transmits the electronic access code to the mobile electronic device. The electronic access code is operable to lock and unlock the electronic lock when transmitted, using near-field-communication technology, to the electronic lock.

12 Claims, 7 Drawing Sheets

ELECTRONIC KEY PROVISIONING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As mobile electronic devices such as mobile phones, personal digital assistants, and laptop computers are becoming more commonly used in almost every aspect of society, they are increasingly being provisioned to perform multiple tasks. For example, a mobile phone may be used to access a public transit system, to pay for services, to access financial information, etc. Many of these operations involve obtaining confidential information from the user which can be stored in a secure element on the mobile electronic device. Transactions can be completed using near-field-communications between the mobile electronic device and a point-of-sale device or a device having an electronic reader. Over time, additional cards, information, and/or electronic access codes can be stored in the secure element or the memory on the mobile electronic device for additional purposes. Generally, a third party service provider maintains the customer information for the associated mobile electronic device.

SUMMARY

A method of initializing an electronic lock is disclosed. The method comprises a point-of-sale terminal reading electronic lock identification information from the electronic lock and the point-of-sale terminal receiving confidential information from a mobile electronic device. The method also comprises an inventory control system that is coupled to the point-of-sale terminal and that transmits an electronic lock registration message, wherein the registration message contains at least some of the confidential information and at least some of the identification information. When the inventory control system receives an electronic access code in response to the electronic lock registration message, the point-of-sale terminal transmits the electronic access code to the mobile electronic device. The electronic access code is operable to lock and unlock the electronic lock when transmitted, using near-field-communication technology, to the electronic lock.

A method of provisioning an electronic access code for an electronic lock to a mobile electronic device is disclosed. The method comprises receiving a first unique identifier associated with a first mobile electronic device and receiving a second unique identifier associated with the electronic lock. The method also comprises looking up an entry in a database based on the second unique identifier and then linking the first unique identifier with the entry in the database. The method then determines a first electronic access code based on a primary code linked with the entry in the database and transmits the first electronic access code to the first mobile electronic device.

A method of initializing an electronic lock is disclosed. The method comprises a point-of-sale terminal reading electronic lock identification information from the electronic lock and an inventory control system, coupled to the point-of-sale terminal, transmitting the lock identification information. When the inventory control system receives a first electronic access code in response to the electronic lock registration message, one of the inventory control system and the point-of-sale terminal prints the first electronic access code. The method also comprises entering the first electronic access code into a first mobile electronic device using an input device of the first mobile electronic device, wherein the first electronic access code is operable to lock and unlock the electronic lock when transmitted, using near-field-communication technology, to the electronic lock.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
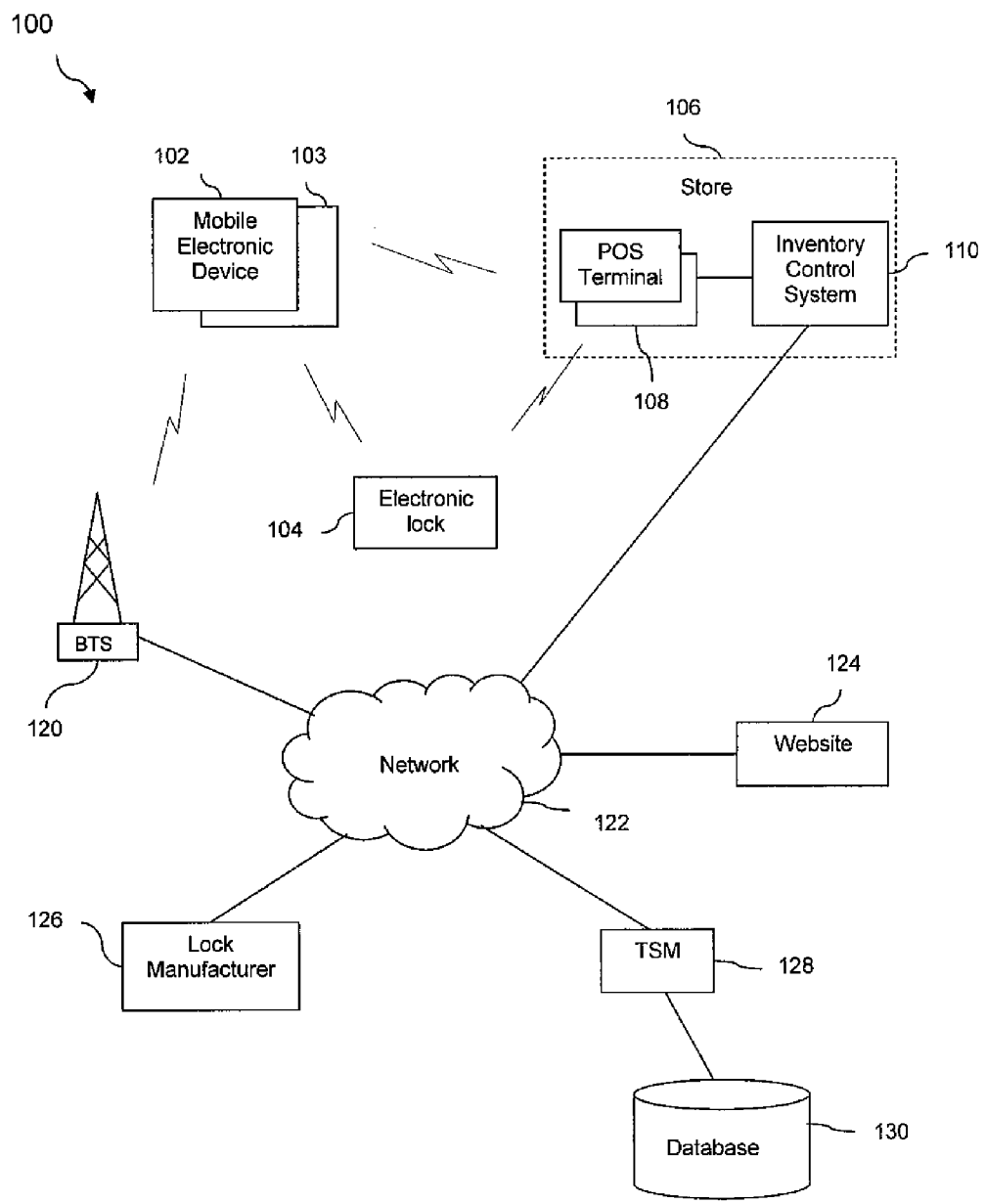
FIG. 1 illustrates a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A method of provisioning an electronic key to a mobile electronic device is disclosed. In an embodiment, an electronic access code can be installed in the mobile electronic device (e.g., mobile phone, personal digital assistant, laptop computer) which can then function as a key to open an electronic lock. For example, when a customer purchases the electronic lock at a store, a point-of-sale terminal can read the identification information (e.g., serial number, registration number, unique identifier number) from the electronic lock, via near-field-communications or by using a scanner such as a bar code scanner or other scanner. The point-of-sale terminal can also receive confidential information from the customer's mobile electronic device (e.g., name, address, phone number) via near-field-communications. The point-of-sale terminal may be connected to an inventory control system at the store which may then communicate with a trusted service manager (TSM). When payment is processed for the electronic lock and the trusted service manager receives the required customer information, the electronic access code can be transmitted from the trusted service manager to the point-of-sale terminal, for example, via the inventory control system. The point-of-sale terminal can then transmit the electronic access code to the mobile electronic device via near-field-communications or by sending a text message. Alternatively, the point-of-sale terminal may print out the electronic access code so that the code can be manually entered into the mobile electronic device.

In another example of provisioning an electronic key, the electronic access code could be sent to the mobile electronic device by means of over-the-air provisioning, wherein the trusted service manager obtains the personal information from the user and the registration information from the electronic lock, possibly based on the user accessing a website. The trusted service manager can link the information from the mobile electronic device and the electronic lock in a database, determine the access code, and transmit the access code over-the-air to the mobile electronic device. Regardless of the method used, once the mobile electronic device obtains the electronic access code, the mobile electronic device can be used as a key to lock or unlock the electronic lock by near-field-communication exchanges with the electronic lock.

In an embodiment, the trusted service manager could be a third party service provider where the electronic lock information is linked to the mobile electronic device and the customer information. The trusted service manager may initially receive information on each electronic lock, including a primary electronic access code, from a lock manufacturer and then track the confidential ownership information and the registration information of each lock once it is purchased. If multiple keys are required for one lock (e.g., for multiple family members, for multiple subcontractors), the trusted service manager can verify the ownership information and transmit multiple electronic access codes to multiple mobile electronic devices. In addition, the trusted service manager can personalize each of the electronic access codes so that some keys have certain permissions and others do not.

The trusted service manager also may set up a website so that electronic lock users can access and maintain ownership information and/or request a transfer of ownership. For example, if a homeowner sells a house that contains an electronic lock, the homeowner can notify the trusted service manager, via the website, of a new homeowner. Once the new homeowner is identified by the original homeowner, the new homeowner can access the website and give the confidential information to obtain an electronic access code for the electronic lock. The trusted service manager can then transmit a new electronic access code to the mobile electronic device of the new homeowner and subsequently delete the original electronic access code from the mobile electronic device of the original homeowner. The homeowner can also use the website of the trusted service manager to add keys for additional users or to delete keys for existing users. The homeowner would be responsible for confirming the identities of any additional users of the electronic keys.

Turning now to FIG. 1, a system 100 for provisioning an electronic key is described. The system 100 comprises a mobile electronic device 102, a second mobile electronic device 103, a store 106 that contains a point-of-sale (POS) terminal 108 and an inventory control system 110, an electronic lock 104, a base transceiver station 120, a network 122, a website 124, a lock manufacturer 126, a trusted service manager 128, and a database 130. The mobile electronic devices 102 and 103 can communicate wirelessly through the base transceiver station 120 and the network 122 to the trusted service manager 128 and may be implemented as a mobile phone, a personal digital assistant, or other mobile electronic device having wireless communication capability. A mobile phone is discussed in detail hereinafter. Multiple mobile electronic devices may access the same electronic lock although only two are shown. The point-of-sale terminal 108 may be a cash register or other type of electronic reader used to complete customer transactions and is connected to the inventory control system 110 within the store 106. Multiple point-of-sale terminals may exist in the store 106 although only one is discussed. The inventory control system 110 tracks the purchase and sale of the electronic lock 104 and may be implemented as a general purpose computer system. General purpose computers are discussed in detail hereinafter. The electronic lock 104 may be purchased in the store 106 and installed in a home either by a subcontractor or a homeowner and can be locked and unlocked, via near-field-communications, by a mobile electronic device 102 that has been provisioned with an electronic key to the electronic lock 104. Multiple electronic locks 104 may be sold in the store 106 although only one is discussed. The trusted service manager 128 may be a third party service provider that records the confidential customer information, the mobile electronic device 102 and 103 information, and the electronic lock 104 information in the database 130. The trusted service manager 128 also may maintain the website 124, through the network 122, which can be accessed by customers to maintain and transfer lock information. The lock manufacturer 126 transmits the identifying information of the electronic lock 104, through the network 122, to the trusted service manager 128, so that the trusted service manager 128 can maintain the records and ownership information of the electronic lock 104 once it is purchased.

In an embodiment, when a customer purchases the electronic lock 104, various methods may be implemented to provision an electronic access code to allow the mobile electronic device 102 to function as a key to open the electronic lock 104. For example, when payment is processed for the electronic lock 104, the point-of-sale terminal 108 can obtain the identification information (e.g., registration number, serial number, unique identifier number) from the electronic lock 104 via near-field-communications or via an optical scanner. The point-of-sale terminal 108 can also communicate, via near-field-communications, with the customer's mobile electronic device 102 to obtain customer information (e.g., phone number, address, name). The point-of-sale terminal 108 may then send the required identification information to the trusted service manager 128 by communicating through the inventory control system 110 and the network 122. The electronic access code can then be transmitted from the trusted service manager 128 back to the point-of-sale terminal 108. The point-of-sale terminal 108 can then transmit the electronic access code to the mobile electronic device 102 by using near-field-communications, by sending a text message, or by printing the electronic access code on a piece of paper so that the code can be manually entered into the mobile electronic device 102. When the mobile electronic device 102 obtains the electronic access code, the mobile electronic device 102 can then be used as a key to lock or unlock the electronic lock 104 by means of near-field-communication exchanges with the electronic lock 104.

As an alternative method for provisioning the electronic key, the electronic access code could also be sent to the mobile electronic device 102 by means of over-the-air provisioning, without the use of the point-of-sale terminal 108. In this scenario, once the electronic lock 104 is purchased, the customer can send the required confidential information, the mobile electronic device 102 information, and the electronic lock 104 registration information to the trusted service manager 128, possibly by logging into the website 124. The trusted service manager 128 can then link the information from the mobile electronic device 102 and the electronic lock 104 in the database 130, determine the electronic access code, and then transmit the electronic access code through the network 122 and the base transceiver station 120 to the mobile electronic device 102.

In an embodiment, the trusted service manager 128 may receive identifying information for the electronic lock 104 from the lock manufacturer 126 and store it in the database 130. Once the electronic lock 104 is purchased, the trusted service manager 128 links the identifying information to the mobile electronic device 102 and the confidential customer information. The trusted service manager 128 can issue the access key related to the primary key, recognize other keys derived from the primary key, and provide security so that ownership is validated for additional keys, transferred keys, or disabled keys. In an effort to prevent duplicates or a break in security, the trusted service manager 128 may use a validation process to detect if the key already has an owner. The trusted service manager 128 may also maintain the website 124, wherein the customers can log in and maintain their confidential information, request additional keys for the electronic lock 104, and/or request a transfer of ownership of the electronic lock 104.

In an example of requesting additional keys, if the customer requires multiple keys for one lock (e.g., for multiple family members, for multiple subcontractors), the customer can request the keys at the point-of-sale terminal 108, through the website 124, or by using the mobile electronic device 102. The trusted service manager 128 can then verify the ownership information and transmit multiple electronic access codes to multiple mobile electronic devices 102 by various means (e.g., using near-field-communications at the point of sale terminal 108, sending SMS text messages, using wireless communications, providing a printout with the electronic access codes). In addition, the trusted service manager 128 can personalize each of the electronic access codes (using either symmetric encryption or asymmetric encryption) so that some keys have certain permissions and others do not. For example, the electronic access code sent to the mobile electronic device 102 of a person that provides cleaning services for the home, may only be enabled to open the electronic lock 104 on Mondays between 8:00 a.m. and 1:00 p.m. In an embodiment, a key provided to a contractor or service personnel may expire after a predefined number of days or after a programmable number of days.

In an example of transferring ownership, if the ownership of the electronic lock 104 is transferred (e.g., a contractor installs the lock on a house and the house is sold to a homeowner), the contractor can notify the trusted service manager 128 of a new homeowner via the website 124. The new homeowner can then access the website 124 and submit the remaining confidential information required to obtain a new electronic access code for the electronic lock 104, including identifying information (e.g., phone number) of the second mobile electronic device 103. The trusted service manager 128 can then transmit the new electronic access code to the second mobile electronic device 103 of the new homeowner, possibly by using over-the-air provisioning, by sending an SMS text message, or by providing a printout with an electronic access code to be manually entered into the second mobile electronic device 103. The trusted service manager 128 can also delete the original electronic access code from the mobile electronic device 102 of the contractor. Alternatively the trusted service manager 128 can disable the electronic access code on the contractor's mobile electronic device 102 so that it no longer works with the electronic lock 104, for example by transmitting an instruction message via a wireless communication link to the electronic lock 104. The trusted service manager 128 can then send a confirmation of the deletion or disablement to the new homeowner.

Figure 2:
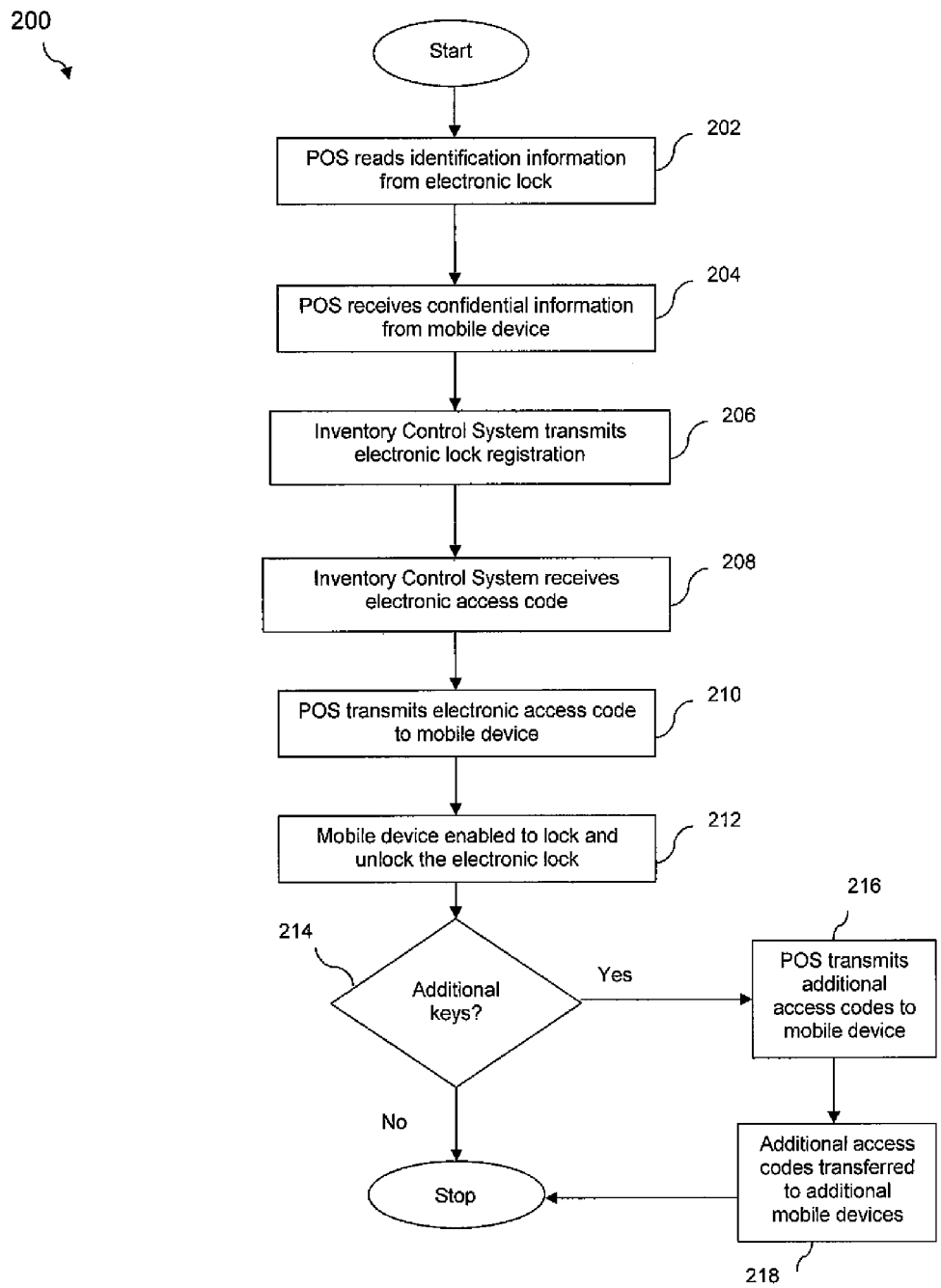
FIG. 2 illustrates a method of initializing an electronic lock according to an embodiment of the disclosure.

Turning now to FIG. 2, a method 200 for initializing an electronic lock is described. The method 200 begins at block 202 where the point-of-sale terminal 108 reads electronic lock identification information from the electronic lock 104 via near-field-communications. The identification information may include a registration number, a serial number, a unique identifier number, or any other information assigned by the lock manufacturer 126. In block 204, the point-of-sale terminal 108 may communicate with the mobile electronic device 102 to obtain confidential customer information (e.g., phone number, address, name, drivers license number), using near-field-communications, infra-red signals, Bluetooth wireless signals, WiFi wireless signals, industrial-scientific-method (ISM) band wireless signals, or other communication signals. In block 206, the inventory control system 110, that is coupled to the point-of-sale terminal 108, may transmit an electronic registration message to the trusted service manager 128. The registration message may contain identifying information from the electronic lock 104 and confidential information from the owner of the mobile electronic device 102. The trusted service manager 128 may obtain a unique electronic access code from the lock manufacturer 126 which may be based on a primary access code and is hereafter associated with the electronic lock 104. Once the lock is registered, the method moves to block 208 wherein the inventory control system 110 receives the electronic access code from the trusted service manager 128. In block 210, the point-of-sale terminal 108, which is coupled to the inventory control system 110, transmits the electronic access code to the mobile device 102. The electronic access code may be transmitted to the mobile electronic device 102 by using near-field-communications, by sending an SMS text message, or by providing a paper printout of the electronic code which may be manually input into the mobile electronic device 102. In block 212, the electronic access code enables the mobile electronic device 102 to lock and unlock the electronic lock 104.

In block 214, the owner of the electronic lock 104 may determine that additional keys are required (e.g., for subcontractors, for multiple family members). The owner can request additional electronic access codes through the point-of-sale terminal 108, which obtains the additional electronic access codes through the inventory control system 110 from the trusted service manager 128. In block 216, the point-of-sale terminal 108 transmits the additional electronic access codes to the mobile electronic device 102. Each of the additional electronic access codes are unique from each other and from the original electronic access code. In block 218, the additional electronic access codes can be transmitted from the mobile electronic device 102 to the additional mobile electronic devices, via near-field-communications, which are then enabled to lock and unlock the electronic lock 104. In an embodiment, the trusted service manager 128 may transmit the key over the air to an identified additional mobile electronic device. In another embodiment, the additional electronic access codes and/or keys may be provided from the primary mobile electronic device, for example the mobile electronic device 102, thereby providing an extra security check against fraudulently deceiving website about identity.

Figure 3:
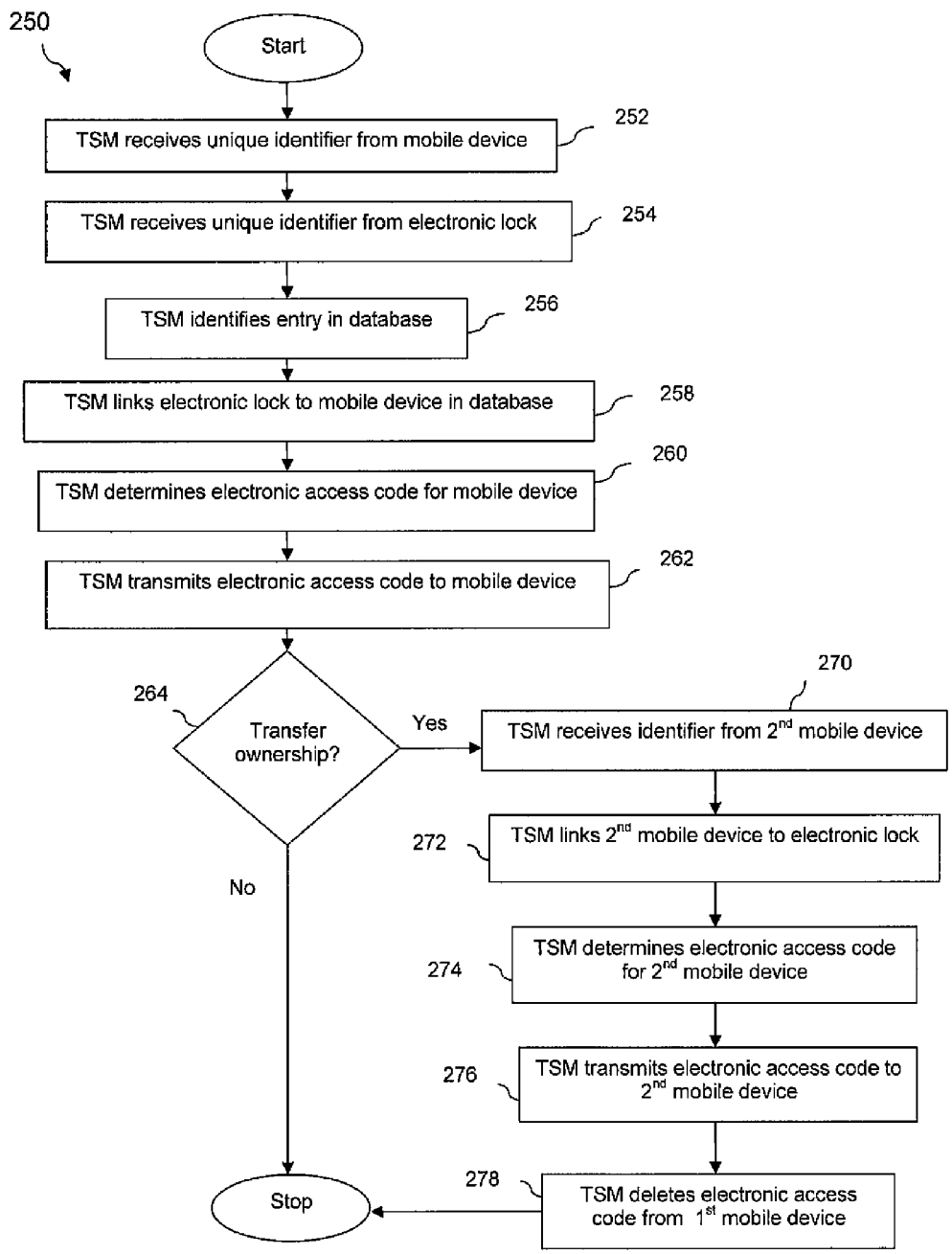
FIG. 3 illustrates a method of provisioning an electronic access code for an electronic lock according to an embodiment of the disclosure.

Turning now to FIG. 3, a method 250 for provisioning an electronic access code for an electronic lock is disclosed. The method 250 begins at block 252 where the trusted service manager 128 receives a unique identifier from a first mobile electronic device 102. The information may be received from the customer possibly by means of the website 124, a phone call, or by a message from the first mobile electronic device 102. The unique identifier may be at least one of the customer's name, the customer's phone number, the customer's address, or the customer's driver's license number. In block 254, the trusted service manager 128, receives a unique identifier from the electronic lock 104, possibly by means of the website 124, a phone call, or by a message from the first mobile electronic device 102. The unique identifier may be at least one of an electronic serial number (ESN), a registration number assigned by the lock manufacturer 126, or a unique identifier number (UID). In block 256, the trusted service manager 128 may use the information received from the electronic lock 104 to identify an entry for the electronic lock 104 in the database 130. The entry may have been previously sent from the lock manufacturer 126 to the trusted service manager 128. At block 258, the trusted service manager 128 links the electronic lock 104 entry to the first mobile electronic device 102 in the database 130. By linking the electronic lock 104 to the first mobile electronic device 102, the user of the first mobile electronic device 102 may be able to access and maintain information regarding ownership of the electronic lock 104.

In block 260, the trusted service manager 128 determines a first electronic access code for the first mobile electronic device 102, based on a primary code linked with the entry in the database 130. The first electronic access code may be determined using symmetric encryption key technology or asymmetric encryption key technology. In block 262, the trusted service manager 128 may transmit the first electronic access code to the first mobile electronic device 102 possibly by means of over-the-air provisioning, an SMS text message, or a paper printout, which then enables the first mobile electronic device 102 to lock and unlock the electronic lock 104.

In block 264, the owner of the electronic lock 104 may transfer ownership of the electronic lock 104 to another owner. For example, if a subcontractor sells a house to a homeowner or a homeowner sells a house to a second homeowner, the first owner can contact the trusted service manager 128 via the website 124, a phone call, or a message from the first mobile electronic device 102, to identify the new owner of the electronic lock 104. In this case, the method moves to block 270 wherein the trusted service manager 128 may receive a unique identifier from the second mobile electronic device 103 via an entry on the website 124 or a phone call from the second owner of the electronic lock 104. The unique identifier may be at least one of a phone number, name, address, or driver's license number. In block 272, the trusted service manager 128 links the second mobile electronic device 103 with the entry in the database 130 for the electronic lock 104. Moving to block 274, the trusted service manager 128 determines a second electronic access code for the second mobile electronic device 103 based on the primary code linked with the entry for the electronic lock 104 in the database 130. In block 276, the trusted service manager 128 transmits the second electronic access code to the second mobile electronic device 103, possibly by means of over-the-air provisioning, an SMS text message, or a paper printout, so that it can lock and unlock the electronic lock 104. In block 278, the trusted service manager 128 can delete the first electronic access code from the first electronic mobile device 102 so that the first electronic mobile device 102 can no longer open the electronic lock 104.

Figure 4:
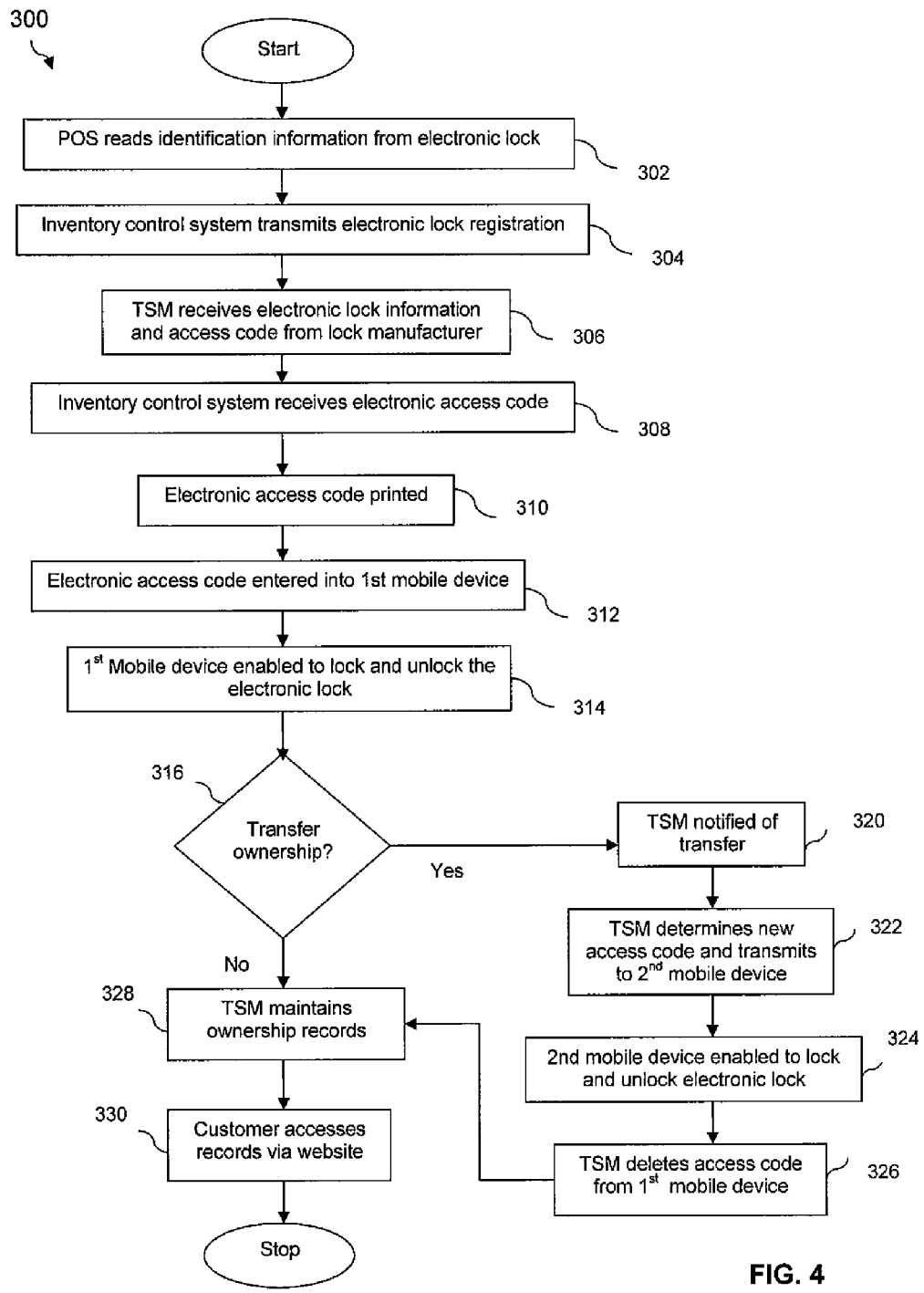
FIG. 4 illustrates another method of initializing an electronic lock according to an embodiment of the disclosure.

In FIG. 4, a method 300 for initializing an electronic lock using a point-of-sale terminal and a trusted service manager is described. The method 300 begins at block 302 where the point-of-sale terminal 108 reads the identifying information from the electronic lock 104 via near-field-communications. The identification information may include a registration number, an electronic serial number (ESN), a unique identifier number (UID), or any other information assigned by the lock manufacturer 126. In block 304, the inventory control system 110 that is coupled to the point-of-sale terminal 108 in the store 106, transmits an electronic registration message through the network 122 to the trusted service manager 128.

In block 306, the trusted service manager 128 receives information regarding the electronic lock 104 from the lock manufacturer 126, including a unique electronic access code which may be based on a primary access code. The action in block 306 may occur when the electronic lock 104 is purchased or it may have been previously sent to the trusted service manager 128 and stored in the database 130. In block 308, the inventory control system 110 at the store 106 receives a first electronic access code, based on the primary access code, from the trusted service manager 128. Moving to block 310 the first electronic access code may be printed by either the point of sale terminal 108 or the inventory control system 110. At block 312, the first electronic access code can be manually entered into the first mobile electronic device 102 using an input device (e.g., keyboard) on the first mobile electronic device 102. In block 314, the first electronic access code enables the first mobile electronic device 102 to lock and unlock the electronic lock 104, via near-field-communications.

In block 316, the owner of the electronic lock 104 can transfer ownership of the lock to a second owner. If so, the method moves to block 320 wherein the trusted service manager 128 is notified of the transfer request. The transfer request may be sent by means of a message from the first mobile electronic device 102 or by a request entered on the website 124. The transfer request may include identification information for the electronic lock 104 and the name and/or phone number of the second owner. Once the first owner identifies the second owner to the trusted service manager 128, the second owner can access the website 124 to enter any required confidential customer information. In block 322, the trusted service manager 128 determines a second electronic access code based on the primary code obtained from the lock manufacturer 126 and transmits the second electronic access code to the second mobile electronic device 103. In block 324, the second mobile electronic device 103 is enabled to lock and unlock the electronic lock 104 via near-field-communications. In block 326, the trusted service manager 128 can transmit a message to the first mobile electronic device 102 to delete the first electronic access code so that it can no longer lock or unlock the electronic lock 104. In block 328, regardless of whether ownership of the lock is transferred, the trusted service manager 128 maintains ownership records for the electronic lock 104 in the database 130 and maintains the website 124. In block 330, the website 124 can be accessed by the owner of the electronic lock 104 to maintain and transfer ownership information.

Figure 5:
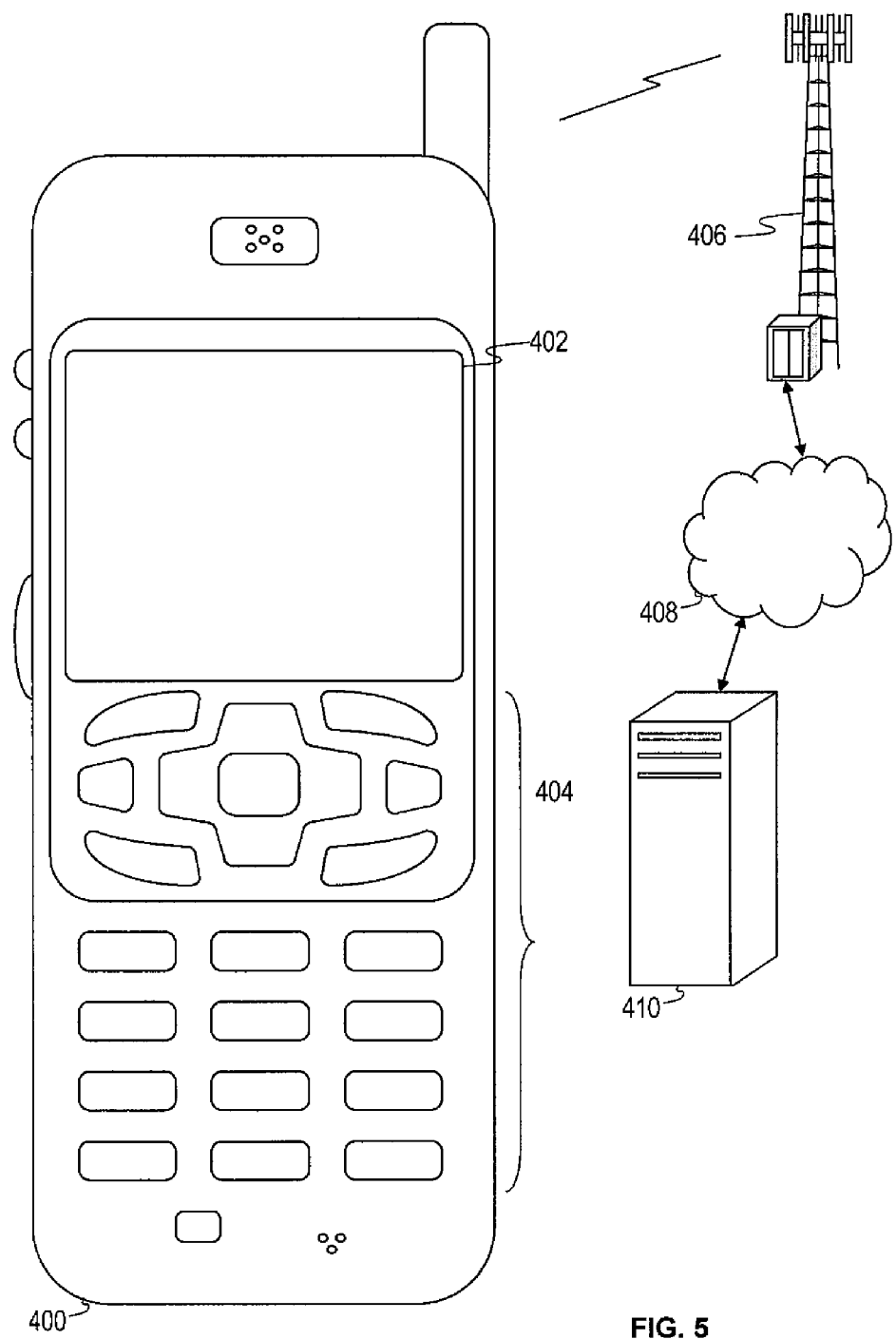
FIG. 5 illustrates a handset suitable for implementing an embodiment of the disclosure.

FIG. 5 shows a wireless communications system including the mobile device 400 which may be similar to the mobile device 102 in FIG. 1. FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser application which enables the display 402 to show a web page. The web page may be obtained via wireless communications with a base transceiver station (BTS) 406, a wireless network access node, a peer mobile device 400 or any other wireless communication network or system. While a single base transceiver station 406 is illustrated, it is understood that the wireless communication system may comprise additional base transceiver stations. In some instances, the mobile device 400 may be in communication with multiple base transceiver stations 406 at the same time. The base transceiver station 406 (or wireless network access node) is coupled to a wired network 408, such as the Internet. Via the wireless link and the wired network, the mobile device 400 has access to information on various servers, such as a server 410. The server 410 may provide content that may be shown on the display 402. Alternately, the mobile device 400 may access the base transceiver station 406 through a peer mobile device 400 acting as an intermediary, in a relay type or hop type of connection.

Figure 6:
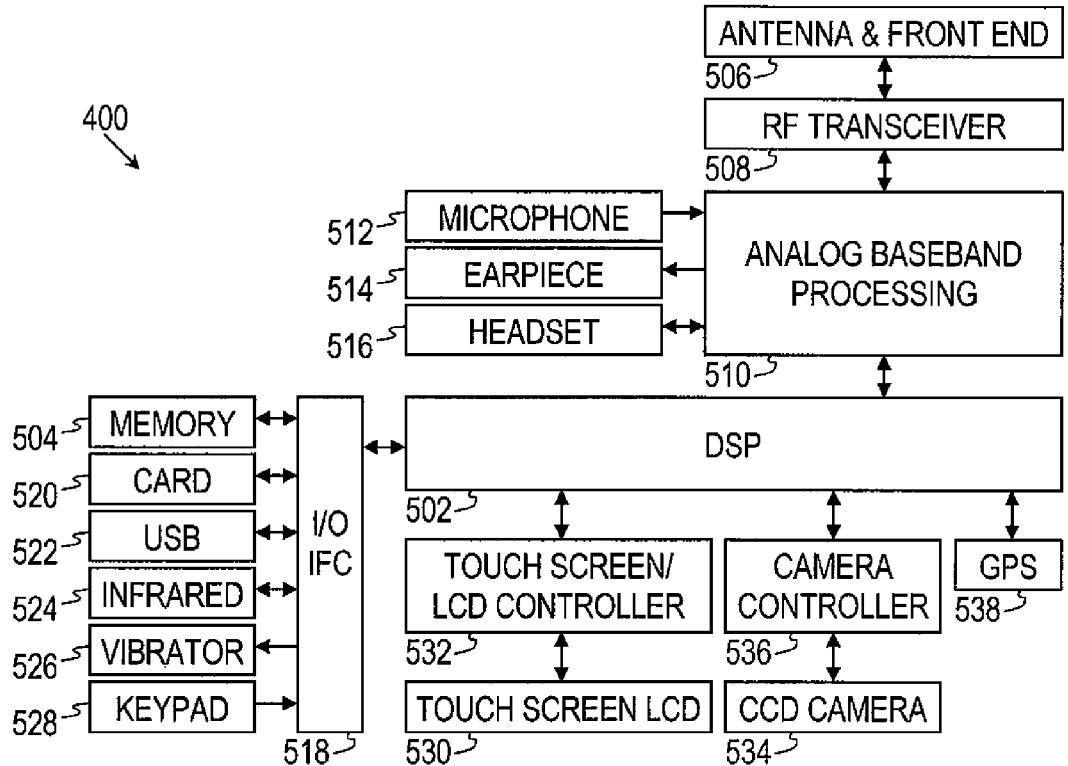
FIG. 6 is a block diagram of a handset suitable for implementing an embodiment of the disclosure.

FIG. 6 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide internet connectivity to enable a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 7:
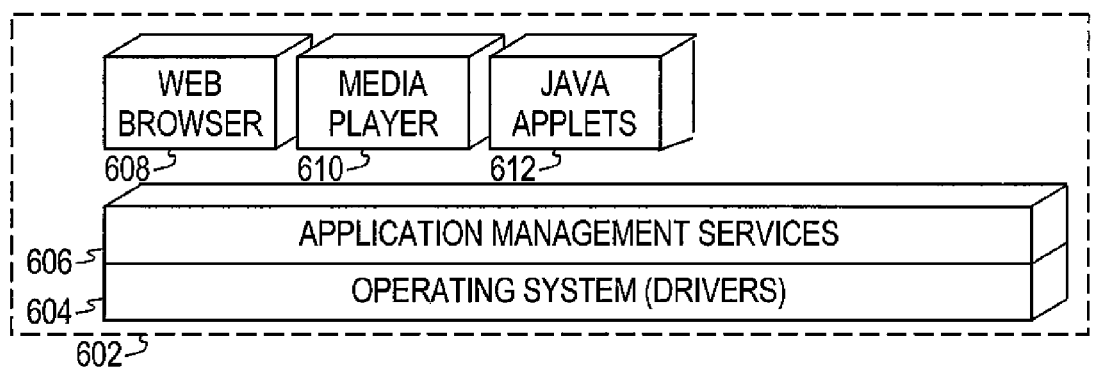
FIG. 7 is a block diagram of a software architecture of a handset suitable for implementing an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 7 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 8:
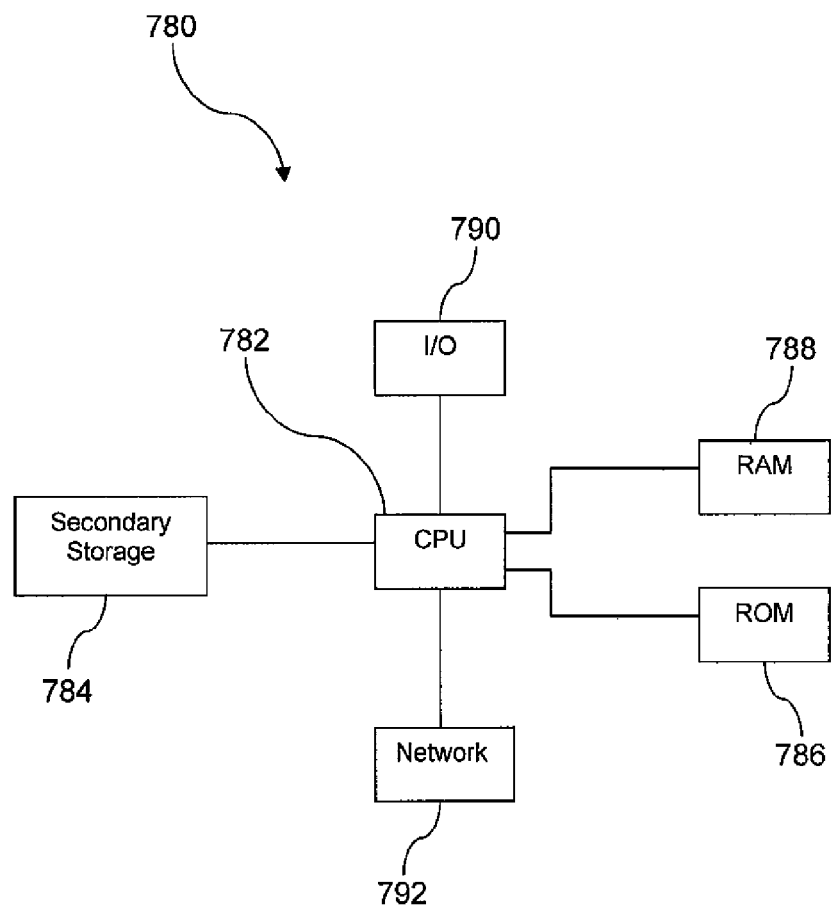
FIG. 8 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store nonvolatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embodied in the carrier wave may be sequenced differently as desired for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of initializing an electronic lock comprising:
   a point-of-sale terminal reading electronic lock identification information from the electronic lock;
   the point-of-sale terminal receiving confidential information from a mobile electronic device;
   an inventory control system transmitting an electronic lock registration message, the registration message containing at least some of the confidential information and at least some of the identification information, the inventory control system coupled to the point-of-sale terminal;
   the inventory control system receiving an electronic access code in response to the electronic lock registration message;
   the point-of-sale terminal transmitting the electronic access code to the mobile electronic device, wherein the electronic access code is operable to lock and unlock the electronic lock when transmitted using near-field communication technology to the electronic lock;
   the mobile electronic device transmitting an ownership transfer message to a trusted service manager (TSM) containing lock identification information and confidential information associated with a second mobile electronic device;
   the trusted service manager determining a second electronic access code based on a primary access code;
   the trusted service manager transmitting the second electronic access code to the second mobile electronic device, wherein the second electronic access code is operable to lock and unlock the electronic lock when transmitted using near-field-communication technology to the electronic lock; and
   the trusted service manager transmitting an access code deletion message to the mobile electronic device, wherein the mobile electronic device is instructed to delete the electronic access code.

2. The method of claim 1, wherein the point-of-sale terminal receives confidential information from the mobile electronic device using near field communication technology.

3. The method of claim 1, wherein the confidential information received from the mobile electronic device is at least one of a customer name, a customer phone number, a customer address, and a driver's license number.

4. The method of claim 1, wherein transmitting the electronic access code to the mobile electronic device comprises one of providing a paper printout containing a printed value of the electronic access code, transmitting the electronic access code using a near field communication technology to the mobile electronic device, and transmitting the electronic access code in a short message service SMS text message to the mobile device.

5. The method of claim 1, wherein the electronic access code is based on the primary access code received from the manufacturer of the electronic lock.

6. The method of claim 1, further including transmitting additional electronic access codes to the mobile electronic device, wherein the additional electronic access codes is transferred from the mobile electronic device to other mobile electronic devices, and wherein the additional electronic access codes are different from each other and from the electronic access code.

7. The method of claim 1, wherein the mobile electronic device is one of a mobile phone, a personal digital assistant, a media player, and a laptop computer.

8. A method of initializing an electronic lock, comprising:
   a point-of-sale terminal reading electronic lock identification information from the electronic lock;
   an inventory control system transmitting the lock identification information, the inventory control system coupled to the point-of-sale terminal;
   the inventory control system receiving a first electronic access code in response to the an electronic lock registration message;
   one of the inventory control system and the point-of-sale terminal printing the first electronic access code;
   entering the first electronic access code into a first mobile electronic device using an input device of the first mobile electronic device, wherein the first electronic access code is operable to lock and unlock the electronic lock when transmitted using near-field-communication technology to the electronic lock;
   the first mobile electronic device transmitting an ownership transfer message to a trusted service manager (TSM) containing lock identification information and confidential information associated with a second mobile electronic device;

the trusted service manager determining a second electronic access code based on a primary access code;

the trusted service manager transmitting the second electronic access code to the second mobile electronic device, wherein the second electronic access code is operable to lock and unlock the electronic lock when transmitted using near-field-communication technology to the electronic lock; and the trusted service manager transmitting an access code deletion message to the first mobile electronic device, wherein the first mobile electronic device is instructed to delete the first electronic access code.

9. The method of claim 8, further including the trusted service manager receiving the electronic lock identification information and the primary access code from the manufacturer of the lock, wherein the first electronic access code is based on the primary access code.

10. The method of claim 9, wherein the trusted service manager maintains a record of the ownership of the electronic lock.

11. The method of claim 8, further including maintaining the electronic lock information via a website maintained by the trusted service manager.

12. The method of claim 8, wherein the mobile electronic device is one of a mobile phone, a personal digital assistant, and a laptop computer.

* * * * *